United States Patent Office 2,923,663
Patented Feb. 2, 1960

2,923,663

METHOD OF STABILIZING VITAMIN B-12 ACTIVE MATERIAL

Henry J. Buehler, St. Louis, Mo., assignor to Anheuser-Busch, Incorporated, St. Louis, Mo., a corporation of Missouri No Drawing. Application August 16, 1957
Serial No. 678,537

8 Claims. (Cl. 167—81)

The present invention relates generally to vitamin B-12 compositions, and more particularly to a novel method of stabilizing vitamin B-12 active materials.

During the past few years, considerable effort has been expended in devising methods for producing vitamin B-12 active materials, as from fermentation processes employing microorganisms which elaborate the material.

However, the solid concentrate and the aqueous solution obtained from microorganisms are frequently quite unstable and lose their vitamin B-12 activity upon standing, or when they are subjected to an accelerated shelf life test, as by heating at 120° C. for 30 minutes.

It is believed that ascorbic acid and thiamine, and possibly other factors contained in an aqueous solution, are primarily responsible for this loss of vitamin B-12 activity. It should be understood that vitamin B-12 is not always taken by itself, but is often combined with other vitamins in solution or tablet form. These other vitamins generally include vitamin C (ascorbic acid) and vitamin B-1 (thiamine chloride), and therefore, vitamin B-12 is often in the presence of certain substances which tend to make the vitamin B-12 unstable.

It is an object of the present invention therefore, to provide a novel method for stabilizing the vitamin B-12 active material obtained from fermentation processes and other sources. More particularly, it is an object to provide a method for deterring the breakdown of the vitamin B-12 active material during the concentration procedure, and to further stabilize the materal after it is in the concentrated form. Another object is to stabilize vitamin B-12 active material without discoloring it in any way.

Briefly stated, the invention comprises the addition of substances furnishing soluble molybdenum to the material before the extraction procedure begins and/or to the concentrate itself.

I have discovered that molybdate salts will provide soluble molybdenum which stabilizes the vitamin B-12 active material. These salts include but are not limited to sodium molybdate and ammonium molybdate, which are both readily available from commercial sources at the present time.

The test employed to determine the relative stability of the vitamin B-12 active material under various conditions and with different salts, is similar to that of Campbell, McLaughlin, and Chapman, A. M. Phar. Assoc. (1952) 41, 479.

The following Table No. 1 shows the effectiveness of soluble molybdenum in the stabilization of vitamin B-12 against ascorbic acid and thiamine. In all cases, the total volume of solution was 12 milliliters containing 10 micrograms (mcg.) or gammas of vitamin B-12, 150 milligrams (mg.) of ascorbic acid, and 10 milligrams of thiamine. The various solutions containing the quantites of molybdenum hereinafter ilsted were then heated at 70° C. for 30 minutes.

Table No. 1 shows that for maximum protection, the molybdenum content should be a minimum of about Table No. 1

| Molybdate Salt | Mg. of Salt | Mg. of Mo in Salt | Mcg. of B-12 Present | Percent Recovery |
|---|---|---|---|---|
| Sodium molybdate (Na$_2$MoO$_4$·2H$_2$O) | none | none | 10 | 5 |
| Sodium molybdate (Na$_2$MoO$_4$·2H$_2$O) | 0.2 | 0.08 | 10 | 12 |
| Sodium molybdate (Na$_2$MoO$_4$·2H$_2$O) | 2.0 | 0.8 | 10 | 50 |
| Sodium molybdate (Na$_2$MoO$_4$·2H$_2$O) | 4.0 | 1.6 | 10 | 90 |
| Sodium molybdate (Na$_2$MoO$_4$·2H$_2$O) | 5.0 | 2.0 | 10 | 100 |
| Sodium molybdate (Na$_2$MoO$_4$·2H$_2$O) | 50.0 | 20.0 | 10 | 100 |
| Sodium molybdate (Na$_2$MoO$_4$·2H$_2$O) | 100.0 | 40.0 | 10 | 100 |
| Ammonium molybdate ((NH$_4$)$_6$Mo$_7$O$_{24}$·4H$_2$O) | 3.0 | 1.6 | 10 | 70 |
| Ammonium molybdate ((NH$_4$)$_6$Mo$_7$O$_{24}$·4H$_2$O) | 4.0 | 2.1 | 10 | 93 |
| Ammonium molybdate ((NH$_4$)$_6$Mo$_7$O$_{24}$·4H$_2$O) | 5.0 | 2.7 | 10 | 100 |

2 milligrams per 10 micrograms of vitamin B-12 activity. The table also indicates more than about 5 milligrams of molybdate salt per 10 micrograms of vitamin B-12 activity is not necessary, and in commercial practice might even be undesirable in that it would increase costs and result in more diluent. The accuracy of the microbiological assay method for vitamin B-12 is only accurate within limits, the results varying within plus or minus about 10% which therefore is believed to explain the slight difference in results between sodium and ammonium molybdate.

The following Table No. 2 shows the effectiveness of molybdate ions in the stabilization of vitamin B-12 against heat or at a temperature of 120° C. for a period of 15 minutes. In all cases, 12 milliliters of solution containing 10 micrograms of vitamin B-12 and varying amounts of molybdenum, as indicated, were placed in an autoclave at 120° for 15 minutes.

Table No. 2

| Molybdate Salt | Mg. of Salt | Mg. of Mo in Salt | Mcg. of B-12 Present | Percent Recovery |
|---|---|---|---|---|
| Sodium Molybdate (Na$_2$MoO$_4$·2H$_2$O) | none | none | 10 | 6.0 |
| Sodium Molybdate (Na$_2$MoO$_4$·2H$_2$O) | 0.25 | 0.1 | 10 | 100 |
| Sodium Molybdate (Na$_2$MoO$_4$·2H$_2$O) | 0.6 | 0.24 | 10 | 100 |
| Sodium Molybdate (Na$_2$MoO$_4$·2H$_2$O) | 5.0 | 2.0 | 10 | 100 |
| Sodium Molybdate (Na$_2$MoO$_4$·2H$_2$O) | 50.0 | 20.0 | 10 | 100 |
| Sodium Molybdate (Na$_2$MoO$_4$·2H$_2$O) | 100.0 | 40.0 | 10 | 100 |

Table No. 2 illustrates the protection afforded by the molybdate ions when no ascorbic acid or thiamine was present. It will be noted that smaller amounts of molybdate ions are required to stabilize the vitamin B-12 against heat than against ascorbic acid and thiamine. In fact, only about a minimum of about 0.25 milligram of sodium molybdate are necessary to provide sufficient molybdate ions to stabilize 10 micrograms of vitamin B-12 against heat created by a temperature of 120° C. held for a period of 15 minutes. Here again, greater quantities of a molybdate ion producing salt may be used to obtain complete stabilization, but in commercial practice it is preferred to use the minimum amount, or slightly thereover to provide a safety factor, so as to keep the cost at a minimum and to keep the amount of diluent for the vitamin B-12 at a minimum. It is understood that abnormally high levels of molybdenum, far above the quantities herein tested, as is well known, may produce deleterious effects when consumed.

I have also discovered that the addition of soluble molybdenum in the form of soluble molybdate salts to the material prior to extraction and concentration, further aids in stabilizing the vitamin B-12 active material, and actually results in the recovery of more vitamin B-12 active material per fermentation.

Thus, it is apparent that there has been provided a novel method for stabilizing vitamin B-12 active material, which fulfills all of the objects and advantages sought therefor.

When there is no thiamine or ascorbic acid present in an aqueous solution of vitamin B-12 active material, an extremely small amount of soluble molybdenum will provide 100% protection so far as the stability of the vitamin B-12 active material is concerned.

When ascorbic acid and thiamine are present, more soluble molybdenum is required to provide 100% protection, but the amount required is extremely small when compared with the value of the vitamin B-12 active material which is stabilized.

Furthermore, the soluble molybdenum can be added to the microbial preparations either before the extraction process or to the concentrate itself. It should also be understood that it is the presence of the soluble molybdenum which results in the desired stability and that various substances furnishing soluble molybdenum may be used. I presently prefer to use sodium molybdate or ammonium molybdate because they are water soluble and readily available from commercial sources, but other salts can be used as a source of molybdenum ions if desired.

It is to be understood that the foregoing description and tables have been given only by way of illustration and example, and that the method is susceptible of variation without departing from the scope of the invention, which is limited only by the claims which follow.

What is claimed is:

1. The method of stabilizing vitamin B-12 active materials in a multivitamin composition which includes the step of adding an amount of a soluble molybdenum compound selected from the group consisting of sodium molybdate and ammonium molybdate sufficient to furnish at least 0.2 milligram soluble molybdenum per gamma of vitamin B-12 activity to a composition comprising vitamin B-12 active materals and at least one other component which is normally deleterious to vitamin B-12 active materials.

2. The method of stabilizing vitamin B-12 active materials in a multivitamin composition which includes the step of adding an amount of ammonium molybdate sufficient to furnish at least 0.2 milligram soluble molybdenum per gamma of vitamin B-12 activity to a composition comprising vitamin B-12 active materials and at least one other component which is normally deleterious to vitamin B-12 active materials.

3. The method of stabilizing vitamin B-12 active material against loss of vitamin B-12 activity upon standing, which includes the step of adding thereto an amount of a soluble molybdate sufficient to furnish at least about 0.01 milligram of soluble molybdenum per gamma of vitamin B-12 activity.

4. The method of stabilizing vitamin B-12 active material against loss of vitamin B-12 activity when exposed to heat which includes the step of adding to the vitamin B-12 active material an amount of a soluble molybdate sufficient to furnish at least about 0.01 milligram of soluble molybdenum per gamma of vitamin B-12 activity.

5. A vitamin B-12 active material composition stable in the presence of heat normally sufficient to destroy the vitamin B-12 activity therein consisting essentially of only vitamin B-12 active substances as the biologically active ingredients and including an amount of a soluble molybdate sufficient to furnish at least about 0.01 milligram of soluble molybdenum per gamma of vitamin B-12 activity.

6. The method of stabilizing vitamin B-12 active materials which includes the step of adding an amount of a soluble molybdate sufficient to furnish at least about 0.2 milligram of soluble molybdenum per gamma of vitamin B-12 activity to a composition comprising vitamin B-12 active materials and at least one other component which is normally deleterious to vitamin B-12 active materials.

7. The method of stabilizing vitamin B-12 active materials in a multivitamin composition which includes the step of adding an amount of a soluble molybdate sufficient to furnish at least 0.2 milligram soluble molybdenum per gamma of vitamin B-12 activity to a composition comprising vitamin B-12 active materials and at least one component normally deleterious to vitamin B-12 active materials selected from the group consisting of thiamine and ascorbic acid.

8. A vitamin B-12 active material composition stable upon aging and in the presence of heat both normally sufficient to destroy the vitamin B-12 activity therein, said composition being essentially free of thiamine and ascorbic acid, including therein an amount of a soluble molybdate sufficient to furnish at least about 0.01 milligram of soluble molybdenum per gamma of vitamin B-12 activity.

References Cited in the file of this patent

Stapert et al.: Jour. of the Amer. Pharmaceutical Assoc., Sci. Ed., vol. 43, No. 2, February 1954, page 89.